3,445,569
URINARY ACIDIFICATION COMPOSITION
Alfred R. Globus, Long Island City, N.Y., assignor to Guardian Chemical Corporation, Long Island City, N.Y., a corporation of the United States
No Drawing. Continuation of application Ser. No. 400,218, Sept. 29, 1964. This application Oct. 25, 1967, Ser. No. 678,110
Int. Cl. A61k 27/06
U.S. Cl. 424—128                          4 Claims This application is a continuation of Ser. No. 400,218, filed Sept. 29, 1964, now abandoned. This invention relates to a new composition of matter having utility as a urine acidification agent. This invention also relates to a method for using these compositions.

The acidification of the urine in humans as well as in animals is often extremely important in the treatment of certain urinary disorders. In urine having a pH of 7 or higher, and particularly with a pH greater than 7.5, the growth of micro-organisms is fostered and high bacterial count often results. Many of these micro-organisms are known as "urine-splitting" organisms and their activity in this regard results in the precipitation of insoluble calcium compounds. This, coupled with the fact that calcium phosphate and magnesium ammonium phosphate are less soluble in urine at higher pH values, results in the formation of kidney and bladder stones, encrustations on the wall of the bladder, and similar calcifications of the urinary tract along with their resultant complications. The combination of calcification and the encouragement of bacterial growth result in infection of the bladder or some other part of the genito-urinary tract.

A great deal of work has been done in developing acidifying agents for the acidification of urine, such as ordinary sodium acid phosphate, ammonium chloride, ammonium nitrate, etc., but the clinical usefulness of these compounds is greatly limited in that their use is associated with a high incidence of undesirable, and sometimes deleterious, side effects; especially with prolonged usage, their activity is not readily predictable and is often of a weak and fleeting nature and/or are limited by the mode and amount in which they can be administered. Certain of the known products, as for instance mandelic acid, to be effective must be given in large dosages in order to obtain sufficient acidification, the same producing nausea and vomiting with possible kidney damage. Further, mandelic acid itself is too irritating for oral administration and must, as a result, be given as the salt. While this eliminates to a considerable extent the problem of irritation, supplementary acidifying agents must invariably be given along with the salt.

In accordance with the invention, a new superior urinary acidifying composition has been developed producing marked acidification of the urine down to a level approaching a pH of 5.0 without any toxic manifestations even when the same is administered in quantities of ten times the dosage required for periods of months or even years. Experiments indicate that the compositions have urinary acidifying power superior to any of the known materials; that their action is both rapid and prolonged and frequent dosage is not necessary in order to attain satisfactory acidification, and, further, that their use is associated with no incidence of any undesirable side effects.

The use of these compositions results in a marked decrease in the pH of the urine, increased solubility of calcium, and decreased bacterial counts (urinary antisepsis), attributable almost entirely, or entirely, to the consistently low levels of pH which can be attained and maintained.

Furthermore, the novel compositions are indicated as a supplement to other therapeutic agents which require an acid medium for activity.

The compositions of the invention are composed entirely of several acid phosphates which are derived from food-grade materials. The compositions of the invention are composed of monosodium phosphate and sodium acid pyrophosphate. Preferably there is additionally present monoammonium phosphate. The sodium acid pyrophosphate is derived in the conventional manner by the dehydration of monosodium phosphate, i.e., by heating with the elimination of one mol of water from two mols of monosodium phosphate. While the composition of the invention produces entirely satisfactory results when prepared solely from monosodium phosphate and sodium acid pyrophosphate, the addition of the monoammonium phosphate serves to increase the effectiveness of the resulting composition with the simultaneous decrease in the contained sodium which is essential when the product is to be used for patients who are limited as to the ingestion of sodium.

For optimum results, the composition consists of approximately one part each of monosodium phosphate, monoammonium phosphate and sodium acid pyrophosphate. Of course, a variation in the relationship of the quantities of the pyrophosphates to the monophosphates is practical and, since it has been established that one mol of the pyrophosphate hydrolyzes to give two mols of the monophosphate as little as 25% of the pyrophosphate serves to produce consistent results in the urinary acidification. While it has been observed that monosodium phosphate and/or monoammonium phosphate produces a marked decrease in the urinary pH within a matter of several hours following ingestion, this decrease in pH is of short duration and, unless the administration of the aforesaid phosphates is frequently repeated, the pH of the urine is subject to a rise in a matter of several hours. This results in rapid fluctuations from acid to alkaline without dependable control.

The sodium acid pyrophosphate, after ingestion, reacts with moisture present in the digestive system and is solely converted to the monosodium phosphate, thereby maintaining an adequate level in the blood to produce prolonged and comparatively consistent results from the standpoint of urinary acidification when the sodium acid pyrophosphate is given in conjunction with the monosodium phosphate and/or monoammonium phosphate.

Further, since the monoammonium or monosodium phosphate are hygroscopic, the presence of a pyrophosphate tends to stabilize these also.

The following examples are given in order to more clearly disclose the nature of the present invention. It should be understood, however, that the examples are not intended to be a limitation on the scope of the invention.

EXAMPLE 1

A mixture of one part by weight of monosodium phosphate, monoammonium phosphate, and sodium acid pyrophosphate was prepared. The sodium acid pyrophosphate was prepared by dehydration of monosodium phosphate by heating monosodium phosphate until one mol of water had been eliminated from two mols of monosodium phosphate.

EXAMPLE 2

A mixture of one part by weight of monosodium phosphate and one part by weight of sodium acid pyrophosphate was prepared. The sodium acid pyrophosphate was obtained in accordance with the procedure set out in Example 1.

The composition of the invention is compounded in the conventional manner and may be administered in the form of powders, capsules, or, alternatively, may be administered in tablet form. The average dosage required to produce a urinary acidification, i.e., a reaction of the urine which is distinctly acid and preferably a pH of 5.3 and lower, amounts to 3 to 6 gms./ day in ½–1.0 gram units administered 3–4 times daily. A preferred dosage unit form is a tablet containing ½-gram of the mixture of monosodium phosphate, sodium acid pyrophosphate or of the above and monoammonium phosphate. The composition of the invention may be given alone or in combination with other therapeutic agents as, for example, antibiotics, etc. The composition of the invention is, however, capable of destroying most urinary tract pathogens without concomitant administration of a bactericidal agent.

The composition is virtually non-toxic and non-sensitizing and may be administered indefinitely with safety and with undiminished efficacy.

What is claimed is:

1. A medicinal agent for acidifying urine comprising equal parts by weight of monosodium phosphate and sodium acid pyrophosphate.

2. A medicinal agent for acidifying urine according to claim 1 additionally containing monoammonium phosphate wherein said monosodium phosphate, sodium acid pyrophosphate and monoammonium phosphate are present in equal parts by weight.

3. A method of lowering urinary pH in mammals which comprises orally administering to a mammal a medicinal agent according to claim 1 in dosage unit form.

4. A method of lowering urinary pH in mammals which comprises orally administering to a mammal a medicinal agent according to claim 2 in dosage unit form.

References Cited

UNITED STATES PATENTS 3,184,381   5/1965   Ashmead _____ 167—65

OTHER REFERENCES

Falconer et al., Current Drug Handbook, 1961–62, W. B. Saunders Company, Philadelphia, Pa., pp. 141, 142.

ALBERT T. MEYERS, *Primary Examiner.*

J. GOLDBERG, *Assistant Examiner.*